US010634229B2

(12) United States Patent
Ilk et al.

(10) Patent No.: US 10,634,229 B2
(45) Date of Patent: Apr. 28, 2020

(54) TRANSMISSION ARRANGEMENT FOR A TRAVEL DRIVE, TRAVEL DRIVE WITH THE TRANSMISSION ARRANGEMENT AND METHOD FOR CONTROLLING THE TRANSMISSION ARRANGEMENT

(71) Applicant: Robert Bosch GmbH, Stuttgart (DE)

(72) Inventors: Erich Ilk, Augsburg (DE); Norman Brix, Leipheim (DE)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 15/588,633

(22) Filed: May 6, 2017

(65) Prior Publication Data

US 2017/0328458 A1  Nov. 16, 2017

(30) Foreign Application Priority Data

May 13, 2016  (DE) .................. 10 2016 208 295
Apr. 13, 2017  (DE) .................. 10 2017 206 375

(51) Int. Cl.
| | |
|---|---|
| *F16H 61/02* | (2006.01) |
| *F16H 59/40* | (2006.01) |
| *F16H 59/54* | (2006.01) |
| *F16H 47/02* | (2006.01) |
| *F16H 61/16* | (2006.01) |

(52) U.S. Cl.
CPC ......... *F16H 47/02* (2013.01); *F16H 61/0213* (2013.01); *F16H 61/16* (2013.01); *F16H 59/40* (2013.01); *F16H 59/54* (2013.01)

(58) Field of Classification Search
CPC ...... F16H 47/02; F16H 61/0213; F16H 59/40; F16H 59/54; F16H 61/16
USPC ......................................... 74/732.1
See application file for complete search history.

(56) References Cited

U.S. PATENT DOCUMENTS

| | | | | |
|---|---|---|---|---|
| 5,492,034 A | * | 2/1996 | Bogema | F16H 3/095 74/15.86 |
| 6,080,074 A | * | 6/2000 | Ulbrich | F16H 47/04 475/72 |
| 7,252,020 B2 | * | 8/2007 | Gray, Jr. | B60K 6/12 74/732.1 |
| 8,522,644 B2 | * | 9/2013 | Matsunaga | F16H 61/0025 477/168 |

FOREIGN PATENT DOCUMENTS

| | | |
|---|---|---|
| DE | 10 2004 061 558 A1 | 7/2006 |
| DE | 10 2005 058 937 A1 | 5/2007 |

* cited by examiner

*Primary Examiner* — Ha Dinh Ho
(74) *Attorney, Agent, or Firm* — Maginot, Moore & Beck LLP

(57) ABSTRACT

A transmission arrangement for a travel drive includes a transmission input that is configured to be coupled to a working machine and a transmission output that is configured to be coupled to an output drive. The transmission arrangement further includes a hydrostatic transmission and a manual transmission coupled in series for the transmission of power between the transmission input and the transmission output. The manual transmission has changeable transmission stages at least when the transmission output is at a standstill. A control device is configured to change the transmission stages.

17 Claims, 1 Drawing Sheet

TRANSMISSION ARRANGEMENT FOR A TRAVEL DRIVE, TRAVEL DRIVE WITH THE TRANSMISSION ARRANGEMENT AND METHOD FOR CONTROLLING THE TRANSMISSION ARRANGEMENT

This application claims priority under 35 U.S.C. § 119 to patent application nos. DE 10 2016 208 295.7, filed on May 13, 2016 in Germany, and DE 10 2017 206 375.0, filed on Apr. 13, 2017 in Germany, the disclosures of which are incorporated herein by reference in their entirety.

BACKGROUND

The disclosure relates to a transmission arrangement, a travel drive with transmission arrangement, as well as a method for controlling the transmission arrangement.

Publication DE 10 2005 058 937 A1 shows a generic travel drive. Therein, a hydrostatic transmission is coupled on one hand to a drive machine and a downstream manual transmission is coupled on the other hand to an output drive. The manual transmission is provided for extending a speed range of the travel drive in comparison with a travel drive with a purely hydrostatic transmission.

In order to be able to perform a transmission stage change in the manual transmission, the manual transmission should be approximately load-free during release of an engaged transmission stage. In other words, the torque acting between the hydrostatic transmission and the manual transmission must be approximately zero. This is ensured in the case of the solution shown via a reduction in the displacement volume of the hydraulic motor. In this torque-free state, the old transmission stage is then disengaged and the new transmission stage can be engaged via a mechanical, friction-based synchronization. The shifting process can be carried during travel or during interruption of travel, i.e. at a standstill.

Publication DE 10 2004 061 558 A1 also shows a generic travel drive in the case of which the manual transmission can be shifted in a similar manner during travel or at a standstill. In the case of the latter solution, it is furthermore proposed to use the reduction in the displacement volume of the hydraulic motor, i.e. the reduction in torque of the hydraulic motor, not only to support the transmission stage change, but also to improve a braking operation. A braking signal is detected by a control unit and, as a result, the displacement volume of the hydraulic motor is reduced to a minimum value. The output shaft of the hydraulic motor is then torque-free and the service brake only has to brake the kinetic energy of the free-rolling vehicle since no drive power of the hydraulic motor which counteracts the braking power is present.

It is disadvantageous in known solutions that, in the case of standstill, a shift release is only carried out as a function of a transmission output rotational speed, namely if this is zero. Although the vehicle is stationary, the vehicle can, however, be accelerated unintentionally under certain ambient conditions (wind, downhill forces) during release of the engaged transmission stages, as a result of which damage to the transmission and even endangering of the vehicle, its occupants and the surroundings are possible.

Against this background, the object on which the disclosure is based is to create a transmission arrangement via which secure shifting at a standstill is enabled. The object furthermore lies in creating a travel drive with such a transmission arrangement and a method for controlling this transmission arrangement.

SUMMARY

The objects are achieved by a transmission arrangement, a travel drive, and a method each having the features the disclosure. Advantageous further developments are described in the subclaims.

A transmission arrangement for a travel drive of a vehicle, in particular for a mobile working machine, has a transmission input, in particular a transmission input shaft, which can be coupled, in particular is coupled, to a drive machine of the travel drive and a transmission output, in particular a transmission output shaft, which can be coupled, in particular is coupled, to an output drive of the travel drive, in particular a wheel or a differential. For the transmission of power between transmission input and transmission output, a hydrostatic transmission and a manual transmission are furthermore provided coupled in series. Both sequences of these two transmissions in principle to one another are alternatively possible (hydrostatic transmission-manual transmission or manual transmission-hydrostatic transmission). The manual transmission has in this case in particular at least two transmission stages which are changeable at least when the transmission output is at a standstill. A control device is furthermore provided via which the change in the transmission stages can be controlled. According to the disclosure, the transmission arrangement, in particular the control device, is configured in such a manner that it is ensured via the control device that the transmission stages can only be changed in the event of standstill of the transmission output when the transmission output is directly or indirectly fixed.

Since the transmission output is coupled in a rotationally conjoint manner to the output drive during use in the travel drive, it is thus prevented that the vehicle starts to move unintentionally during changing of the transmission stages at a standstill, in particular when disengaging the engaged transmission stage. As a result of this, the associated endangerment of people and material, in particular of the transmission arrangement or of the travel drive itself, is also eliminated and more reliable shifting at a standstill, both on the flat and on a hill, is realized.

In a further development, the control device is configured such that a sufficient fixing of the transmission output can be controlled and/or identified via said control device. It is sufficient in this case if a fixing torque of the transmission output is balanced with an acceleration torque acting thereon.

In a further development, the transmission arrangement has a position identification unit via which an inclination of the transmission arrangement and thus in particular the inclination of the travel drive, in particular in relation to the road bed, can be identified. In this further development, the control device is then preferably configured in such a manner that a necessary fixing torque can be identified as a function of the inclination via said control device.

In a further development, the position identification unit has at least one pressure detection unit via which a pressure in the hydraulic circuit can be detected, from which a position and/or change in position can be identified.

Alternatively, the position identification unit has two pressure detection units, one for each of the working lines of the hydraulic circuit, via which the pressures of the working lines can be detected, from which and/or from the difference of which a position and/or change in position can be identified.

In a further development, the transmission arrangement has, for fixing of the transmission output or a component connected in a rotationally conjoint manner thereto, a brake, in particular a foot brake or a standstill or fixing or parking brake. In particular, the brake can be activated via the control device and a braking force or a braking torque can be controlled, in particular as a function of the inclination identified by the position identification unit.

In a further development, the, in particular sufficient, fixing can be identified via the control device as a function of an in particular sufficient braking signal. Here, the braking signal represents, for example, a position of a brake pedal of the transmission arrangement or the like. The braking signals can also depend, for example, on the position of a brake element bringing about the braking or a latching element.

In a further development of the transmission arrangement, the transmission arrangement has a rotational speed detection unit, in particular a rotational speed sensor, via which a rotational speed of the transmission output or a rotational speed of a component connected in a rotationally conjoint manner thereto can be detected. Here, the transmission arrangement is additionally configured in such a manner that the transmission stages can only be changed in the event of standstill via the control device when a rotational speed is detected to be equal to zero. It is thus possible to detect particularly reliably that standstill is actually in place.

In a further development of the transmission arrangement, the manual transmission has an input shaft and an output shaft which can be brought into rotational connection, in each case with a different transmission ratio, with one another via the changeable transmission stages. Here, the transmission output of the transmission arrangement is formed by the output shaft of the manual transmission or the output shaft of the manual transmission is connected in a rotationally conjoint manner to the transmission output of the transmission arrangement.

In a further development of the transmission arrangement, the hydrostatic transmission has a first hydraulic machine with adjustable first displacement volume and a second hydraulic machine, arranged with the latter in an in particular closed hydraulic circuit, with adjustable second displacement volume. The transmission input of the transmission arrangement is formed by a first driveshaft of the first hydraulic machine or the first driveshaft is connected in a rotationally conjoint manner to the transmission input of the transmission arrangement.

In a further development, a second driveshaft of the second hydraulic machine can be connected or is connected in a rotationally conjoint manner to the input shaft of the manual transmission.

In a further development, the transmission arrangement is configured in such a manner that the transmission stages can only be changed in the event of standstill via the control device when a torque of the input shaft of the manual transmission is equal to zero or at least close to zero. In this manner, it is ensured that the input shaft of the manual transmission does not experience any acceleration during release of the engaged transmission stage.

For the purpose of the stated reduction in torque, in a further development, the control device is configured in such a manner that the second displacement volume is controlled to zero or at least close to zero via it for change of the transmission stages.

In a further development of the transmission arrangement, it is configured in such a manner that a change in the transmission stages is enabled outside standstill, i.e. when driving. To this end, it is particularly preferred that the transmission stages can only be changed via the control device when a torque of the input shaft of the manual transmission is equal to zero or at least close to zero. In this further development, for this purpose, the control device is configured, for example, in such a manner that the second displacement volume is controlled to zero or at least close to zero via it in order to change the transmission stages outside of standstill.

A travel drive, in particular for a mobile working machine, has a transmission arrangement which is formed according to any one of the aspects of the preceding description. Here, a drive machine of the travel drive is coupled to the transmission input of the transmission arrangement and an output drive of the travel drive, in particular a wheel, an axle or a differential, is coupled to the transmission output of the transmission arrangement. The above-mentioned are shown to be advantageous for the travel drive such that renewed citing at this point can be omitted.

A method for controlling a transmission arrangement, which is configured according to any one of the aspects of the above description, has a step "Change the transmission stage of the manual transmission in the event of standstill of the transmission output", in particular in the case of standstill of the vehicle. According to the disclosure, the method has a previous step "Fix the transmission output, in particular via the control device". The advantage already cited for the transmission arrangement also applies at this point.

In a further development, the step "Fix the transmission output" is carried out at least via a step "Activate a brake of the transmission arrangement", in particular via an operator or the control device.

In a further development, the method has a step "Control the fixing and/or identify the fixing, via the control device", thus the fixing is carried out and/or checked in a process-reliable manner prior to the change of the transmission stage.

In a further development of the method, the step "Identify the fixing" also contains a step "Identify a rotational speed of the transmission output or a component of the transmission arrangement connected in a rotationally conjoint manner thereto". An explicit check is thus additionally made as to whether standstill is actually in place. The change of the transmission stages is in particular carried out via the control device at a standstill only when determined rotational speed is zero.

In a further development, a step "Control a torque of an input shaft of the manual transmission to zero or to at least approximately zero" precedes the step "Change the transmission stage of the manual transmission in the case of standstill of the transmission output". This is carried out in particular via a step "Control a displacement volume of the second hydraulic machine to zero or close to zero".

In a further development of the method, this contains a step "Change the transmission stages outside standstill", i.e. during travel.

For this purpose, it is preferred if the step "Control the torque of the input shaft of the manual transmission to zero or to at least approximately zero" precedes a step "Change the transmission stage of the manual transmission outside standstill of the transmission output". This is carried out in particular via the step "Control the displacement volume of the second hydraulic machine to zero or close to zero".

The steps control, identify, activate are preferably carried out via the control device.

The step of changing the transmission stage is carried out in particular as a function of an operator request.

Fixing the transmission output, in particular by activating the brake, can be carried out manually via the operator or it is carried out via the control device automatically as a function of the requested change of the transmission stages.

In a further development with manual fixing of the transmission output, the method preferably has a step "Ask an operator to fix the transmission output, in particular for activating the brake". In particular, this request is carried out as a function of the request by the operator issued to the control device in order to change the transmission stages.

The method configured at least according to one of the aspects of the previous description is preferably stored in the cited control device in order to be carried out.

BRIEF DESCRIPTION OF THE DRAWING

An exemplary embodiment of a travel drive according to the disclosure with a transmission arrangement according to the disclosure and a method according to the disclosure are represented in the drawing. The disclosure is thus explained on the basis of the FIGURE of this drawing.

In the FIGURE.

DETAILED DESCRIPTION

Figure 1:
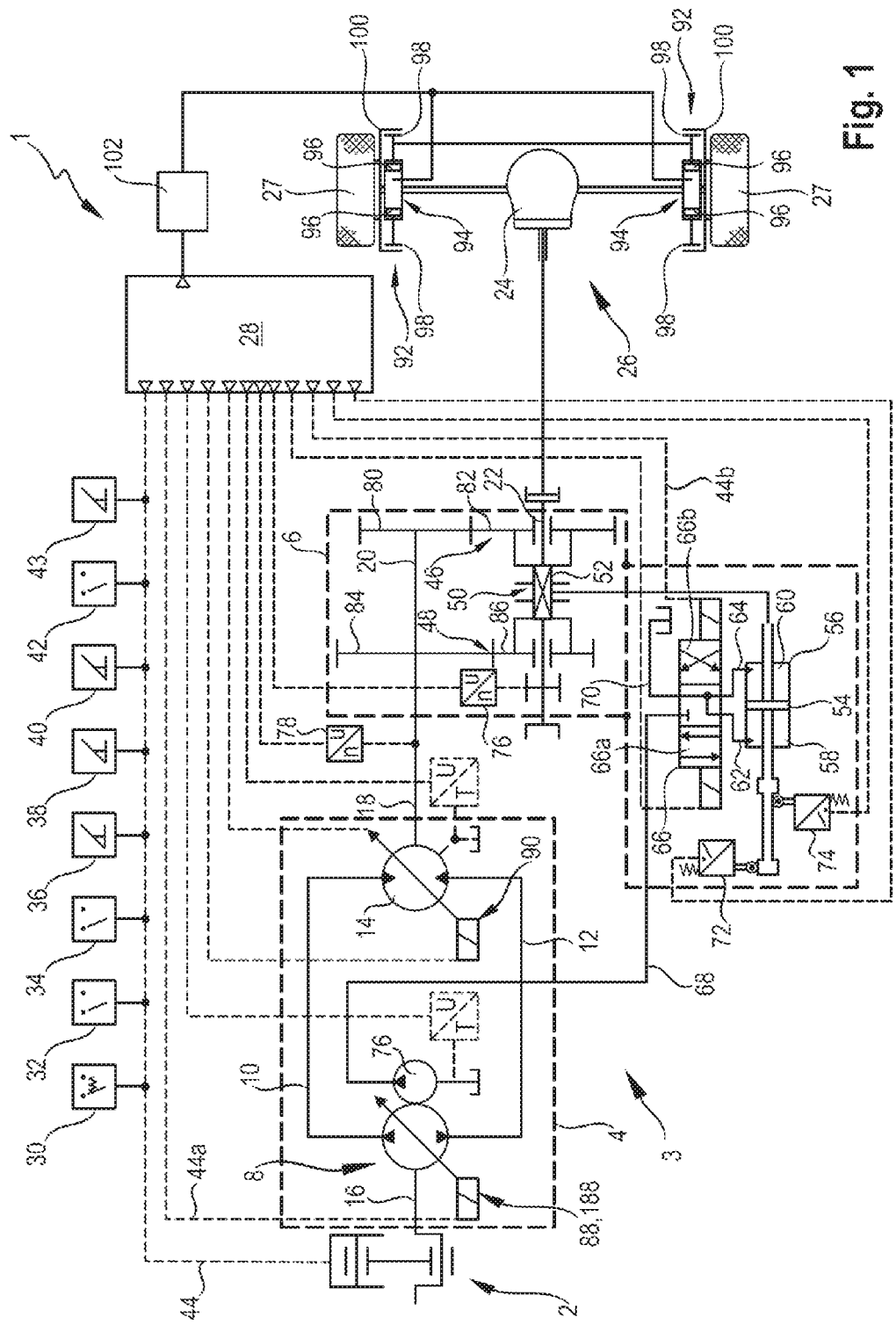
FIG. 1 shows a circuit diagram of an exemplary embodiment of a travel drive.

According to FIG. 1, a travel drive 1, for example, of the mobile drive machine, has a transmission arrangement 3 with a drive machine 2 formed as a diesel engine, a hydrostatic transmission 4 and a manual transmission 6 which is of two-stage configuration in the exemplary embodiment. Hydrostatic transmission 4 has a first hydraulic machine 8 which is configured as an axial pump of oblique disc design and which is fluidically connected via two working lines 10, 12 to a second hydraulic machine 14 formed as an axial piston motor of an oblique axle design in a closed, hydraulic circuit. First hydraulic machine 8 has a first driveshaft 16 which is coupled to drive machine 2 and by which a transmission input of transmission arrangement 3 is formed. A second driveshaft 18 of second hydraulic machine 14 is coupled to an input shaft 20 of manual transmission 6. An output shaft 22 of manual transmission 6 is coupled to a differential 24 of an axle 26 with two wheels 27 of travel drive 1. A transmission output of transmission arrangement 3 is thus formed by output shaft 22.

Both hydraulic machines 8, 14 have in each case an adjustable displacement volume. First hydraulic machine 8 is configured so as to be able to pivot through so that it can operate in all four quadrants, in both torque directions both as a hydraulic pump and also as a hydraulic motor. Second hydraulic machine 14 is only adjustable on one side of its zero displacement volume.

Transmission arrangement 3 furthermore has a control device 28, in particular for control of a change of transmission stages of the manual transmission and of a torque of second driveshaft 18. A shift-request device 30, a gear-selection device 32, a driving direction selection device 34, an accelerator pedal 36, a crawling gear-selection device 38, a brake pedal 40, an automatic selection device 42 and a parking brake lever 43 are signal-connected to control device 28. All stated devices 30 to 43 are signal-connected via a CAN bus 44 on one hand to control device 28 and on the other hand at least to drive machine 2.

Manual transmission 6 has a first transmission stage 46 with a low transmission ratio and a second transmission stage 48 with a higher transmission ratio of rotational speed $n_A$ of output shaft 22 to rotational speed $n_{HM}$ of input shaft 18. Moreover, manual transmission 6 has a jaw clutch 50 which is configured to be synchronizing ring-free. An actuator 52 of jaw clutch 50 is coupled rigidly to a piston 54 of an actuating cylinder 56. The latter has two identical pressurizing medium chambers 58, 60 which are separated by piston 54 and which are connected via control lines 62, 64 to an electromagnetically actuable 4/3-way shift valve 66. The latter has a first shift position 66a in which first pressure chamber 58 is connected to a pressurizing medium line 68 and second pressure chamber 60 is connected to tank line 70. In a second shift position 66b, second pressurizing medium chamber 60 is connected to pressurizing medium line 68 and first pressurizing medium chamber 58 to tank line 70. First shift position 66a brings about a displacement of piston 54 in such a manner that first transmission stage 46 is engaged via jaw clutch 50, second shift position 66b brings about that second transmission stage 48 is engaged via piston 54 and jaw clutch 50.

4/3-way shift valve 66 and actuating cylinder 56 are combined to form a unit. This unit furthermore has two end position switches 72, 74 via which successful shifting of respective transmission stage 46, 48 can be identified on the basis of the position of piston 54. Both end position switches 72, 74 are connected in each case via a signal line to control device 28. 4/3-way shift valve 66 is connected via pressurizing medium line 68 to a feed pump 76.

Hydrostatic transmission 4 has a variable, continuously adjustable transmission ratio range. Manual transmission 6 downstream thereof serves to cover a necessary speed range of travel drive 1. Transmission arrangement 3 is configured in such a manner that manual transmission 6 can be shifted in driving mode and also when the travel drive is at a standstill.

Shifting or changing transmission stages 46, 48 in driving mode and in standstill can be controlled via control device 28.

In order to support control, transmission arrangement 3 has a rotational speed sensor 76 via which rotational speed $n_A$ of the transmission output, i.e. of output shaft 22, can be detected, and a rotational speed sensor 78 via which rotational speed $n_{HM}$ of input shaft 18 can be detected.

First transmission stage 46 has a gearwheel 80 which is coupled fixedly to the input shaft and which is in permanent engagement with an idler 82 which can be coupled via jaw clutch 50 to output shaft 22. Second transmission stage 48 correspondingly has a gearwheel 84 which is coupled fixedly to input shaft 18 and an idler 86 which is permanently in engagement therewith and can be coupled via jaw clutch 50 to output shaft 22.

According to FIG. 1, first hydraulic machine 8 has an adjustment device 88 for adjustment of its first displacement volume $V_{HP}$ and second hydraulic machine 14 has an adjustment device 90 for adjustment of its second displacement volume $V_{HM}$.

Moreover, travel drive 1 has for each wheel 27 of axle 26 a hydraulically actuable brake 92 embodied as a drum brake. Drum brake 92 has in each case a brake cylinder 94 in which two brake pistons 96 lying opposite one another are arranged. As a counterbearing for brake pads shoes 98, a brake housing 110 is connected in a rotationally conjoint manner to each wheel 27.

The description of a change into first transmission stage 46 during standstill of travel drive 1 follows. It should be assumed that an operator of travel drive 1 has braked the vehicle to a standstill with the aid of brake pedal 40. It should furthermore be assumed that the vehicle has now come to a standstill on an inclined surface. Up until this point in time it applies for the description that second transmission stage 48 according to FIG. 1 is engaged.

The operator thus requires a higher torque in order to move off again and would therefore like to engage first transmission stage 46 with a lower transmission ratio. Were he or she to do this without fixing wheels 27 and thus transmission output 22, transmission output 22 would be able to rotate without resistance during release of jaw clutch 50 from idler 86 of second transmission stage 48, as a result of which travel drive 1, or the mobile working machine, would begin to move as a result of the downhill force. This brings with it a high risk which has to be prevented. The method according to the disclosure for changing the transmission stage at a standstill accordingly applies at this point.

The operator initially activates gear selection device 32 and thus issues a request to change from second 48 to first transmission stage 46.

It is consequently identified via the method stored in control device 28 that transmission output 22 is not yet fixed. An actuating signal is accordingly issued via control device 28 to a hydraulic actuating device 102 of brakes 92 without the operator previously having actively activated the parking brake pedal. Thereafter, the pressurizing medium supply of brake cylinder 94 is carried out via actuating device 102 and pressurizing medium lines 104 so that brake shoes 98 are brought to bear with brake housing 100 with a force which is predetermined by control device 28. From this point in time, wheels 27 are fixed, as a result of which transmission output 22 connected via differential 24 in a rotationally conjoint manner to wheels 27 is also fixed.

Next, prior to the change of the transmission stage, a reduction in the torque at input shaft 20 of manual transmission 6 is carried out in that it acts via control device 28 on adjustment device 90 of second hydraulic machine 14 and thus its displacement volume $V_1$ is set to zero. Since both shafts 20, 22 of manual transmission 6 are thus free of torque, the 4/3-way shift valve is thus actuated via control device 28 in such a manner that piston 54 of actuating cylinder 56 moves into its neutral position. It subsequently moves further and brings jaw clutch 50 into form-fitting connection with idler 82 of first transmission stage 46, as a result of which the change in the transmission stages from second 48 to first 46 is completed.

There is disclosed a transmission arrangement for a travel drive, in particular for a mobile working machine, which has a manual transmission connected in series with a hydrostatic transmission. In this case, a transmission output of the transmission arrangement can be coupled to an output drive of the travel drive. The manual transmission has transmission stages which are changeable in the case of standstill of the transmission output, wherein the change can be controlled via a control device of the transmission arrangement. According to the disclosure, it is ensured via the configuration of the transmission arrangement, in particular that of the control device, that change of the transmission stages can only take place in the event of standstill if the vehicle, and in particular the transmission output, is directly or indirectly fixed. Fixing is carried in particular via a parking brake.

There are furthermore disclosed a travel drive with such a transmission arrangement as well as a method for controlling the transmission arrangement via which it is ensured that the relevant vehicle is fixed at a standstill when changing the transmission stages.

LIST OF REFERENCE NUMBERS

1 Travel drive
2 Drive machine
3 Transmission arrangement
4 Hydrostatic transmission
6 Manual transmission
8 First hydraulic machine
10 First working line
12 Second working line
14 Second hydraulic machine
16 First driveshaft/transmission input
18 Second driveshaft
20 Input shaft
22 Output shaft/transmission output
24 Differential
26 Axle
27 Wheel
28 Control device
30 Pivoting angle detection unit
32 Gear-selection device
34 Driving direction selection device
36 Accelerator pedal
38 Crawling gear selection device
40 Brake pedal
42 Automatic selection device
43 Parking brake pedal
44 CAN bus
46 First transmission stage
48 Second transmission stage
50 Jaw clutch
52 Actuator
54 Piston
56 Actuating cylinder
58 First pressure chamber
60 Second pressure chamber
62, 64 Control line
66 4/3-way shift valve
66a First shifting position
66b Second shifting position
68 Pressurizing medium line
70 Tank line
72, 74 End position switch
76, 78 Rotational speed sensor
80, 84 Gearwheel
82, 86 Idler
88 Adjustment device
90 Adjustment device
92 Brake
94 Brake cylinder
96 Brake piston
98 Brake shoe
100 Brake housing
102 Hydraulic actuating device
104 Pressurizing medium line

What is claimed is:
1. A transmission arrangement for a travel drive, comprising:
   a transmission input configured to be coupled to a drive machine;
   a transmission output configured to be coupled to an output drive;
   a hydrostatic transmission and a manual transmission coupled in series for the transmission of power between the transmission input and the transmission output, the manual transmission having changeable transmission stages at least when the transmission output is at a standstill; and
a control device configured to control a change in the transmission stages,
wherein the transmission arrangement is configured such that the transmission stages can only be changed in the event of standstill via the control device when the transmission output is directly or indirectly fixed.

2. The transmission arrangement according to claim 1, wherein a fixing of the transmission output is configured to be one or more of controlled and identified via the control device.

3. The transmission arrangement according to claim 2, further comprising a brake configured to fix the transmission output.

4. The transmission arrangement according to claim 2, wherein the fixing is configured to be identified via the control device as a function of a brake signal.

5. The transmission arrangement according claim 1, further comprising a rotational speed detection unit via which a rotational speed of the transmission output or a rotational speed of a component connected rotationally conjointly thereto is configured to be detected,
wherein the transmission arrangement is configured such that the transmission stages can only be changed in the event of standstill via the control device when the rotational speed is detected to be equal to zero.

6. The transmission arrangement according to claim 1, wherein the manual transmission has an input shaft and an output shaft that are configured to be brought into rotational connection, in each case with a different transmission ratio, with one another via the changeable transmission stages, and wherein the transmission output of the transmission arrangement is formed by the output shaft of the manual transmission.

7. The transmission arrangement according to claim 6, wherein the hydrostatic transmission has a first hydraulic machine with adjustable first displacement volume and a second hydraulic machine, arranged with the latter in a hydraulic circuit, with adjustable second displacement volume, and wherein the transmission input of the transmission arrangement is formed by a first driveshaft of the first hydraulic machine.

8. The transmission arrangement according to claim 7, wherein a second driveshaft of the second hydraulic machine is configured to be connected in a rotationally conjoint manner to the input shaft of the manual transmission.

9. The transmission arrangement according to claim 6, wherein the transmission arrangement is configured such that the transmission stages can only be changed in the event of standstill via the control device when a torque of the input shaft of the manual transmission is equal to zero.

10. The transmission arrangement according to claim 8, wherein the transmission arrangement is configured such that the second displacement volume is controlled to zero via the control device so that the torque of the input shaft of the manual transmission is equal to zero.

11. A travel drive, comprising:
a transmission arrangement, including:
a transmission input,
a transmission output,
a hydrostatic transmission and a manual transmission coupled in series for the transmission of power between the transmission input and the transmission output, the manual transmission having changeable transmission stages at least when the transmission output is at a standstill, and
a control device configured to control a change in the transmission stages,
wherein the transmission arrangement is configured such that the transmission stages can only be changed in the event of standstill via the control device when the transmission output is directly or indirectly fixed;
a drive machine coupled to the transmission input of the transmission arrangement; and
an output drive coupled to the transmission output of the transmission arrangement.

12. A method for controlling a transmission arrangement, the transmission arrangement including a transmission input configured to be coupled to a drive machine, a transmission output configured to be coupled to an output drive, a hydrostatic transmission and a manual transmission coupled in series for the transmission of power between the transmission input and the transmission output, the manual transmission having changeable transmission stages at least when the transmission output is at a standstill, and a control device configured to control a change in the transmission stages, the method comprising:
fixing the transmission output; and
changing the transmission stage of the manual transmission in the event of standstill of the transmission output.

13. The method according to claim 12, wherein fixing the transmission output includes activating a brake of the transmission arrangement.

14. The method according to claim 12, further comprising one or more of:
controlling the fixing via the control device, and
identifying the fixing via the control device.

15. The method according to claim 14, wherein identifying the fixing includes identifying a rotational speed of the transmission output.

16. The transmission arrangement according to claim 1, wherein the transmission arrangement is configured for a mobile working machine, and wherein the output drive is a wheel or a differential.

17. The travel drive according to claim 11, wherein the travel drive is configured for a mobile working machine, and wherein the output drive is configured as a wheel or a differential.

* * * * *